(12) United States Patent
Saboff et al.

(10) Patent No.: US 8,724,813 B2
(45) Date of Patent: May 13, 2014

(54) WIRELESS DEVICE SETUP

(75) Inventors: Michael L Saboff, San Jose, CA (US);
Wolfgang Baltes, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 210 days.

(21) Appl. No.: 13/132,538

(22) PCT Filed: Feb. 25, 2009

(86) PCT No.: PCT/US2009/035126
§ 371 (c)(1),
(2), (4) Date: Jun. 2, 2011

(87) PCT Pub. No.: WO2010/098749
PCT Pub. Date: Sep. 2, 2010

(65) Prior Publication Data
US 2011/0299686 A1    Dec. 8, 2011

(51) Int. Cl.
*H04K 1/00*    (2006.01)
(52) U.S. Cl.
USPC ........... 380/270; 380/274; 713/160; 713/168; 709/227; 709/228; 370/254

(58) Field of Classification Search
USPC ............ 713/160, 168; 709/227–228; 370/254
See application file for complete search history.

(56) References Cited

U.S. PATENT DOCUMENTS

| | | | |
|---|---|---|---|
| 8,085,695 B2* | 12/2011 | Kushalnagar et al. | 370/310 |
| 8,412,942 B2* | 4/2013 | Bestermann | 713/170 |
| 2004/0131188 A1 | 7/2004 | Wang et al. | |
| 2004/0133689 A1* | 7/2004 | Vasisht | 709/228 |
| 2005/0054342 A1* | 3/2005 | Otsuka | 455/426.2 |
| 2006/0168647 A1* | 7/2006 | Chiloyan | 726/4 |
| 2006/0208088 A1* | 9/2006 | Sekiguchi | 235/472.02 |
| 2007/0157024 A1* | 7/2007 | Miller | 713/168 |
| 2008/0137553 A1* | 6/2008 | Hsu et al. | 370/254 |
| 2008/0175386 A1* | 7/2008 | Bestermann | 380/270 |
| 2008/0198823 A1* | 8/2008 | Shiu et al. | 370/338 |
| 2009/0010230 A1* | 1/2009 | Lee et al. | 370/338 |
| 2009/0274065 A1* | 11/2009 | Jin et al. | 370/254 |
| 2010/0265845 A1* | 10/2010 | Lampen | 370/254 |

FOREIGN PATENT DOCUMENTS

KR    10-2007-0040042    4/2007

* cited by examiner

*Primary Examiner* — Jeffrey Pwu
*Assistant Examiner* — Jayesh Jhaveri

(57) ABSTRACT

A computer computes an SSID and a key from a string. The computer wirelessly accesses a wireless-access-device preconfigured with the SSID and the key.

18 Claims, 3 Drawing Sheets

WIRELESS DEVICE SETUP

BACKGROUND

Wireless routers or access points are either shipped with their wireless capabilities disabled or with the wireless capabilities enabled but with no security. For a customer to use such a device, they need to either connect using a cable or in the second case with an unsecured wireless connection. Then they configure the wireless connection to their liking. For some customers, all they do to configure their routers or access points is to enable the wireless capability without any security. These existing techniques are inconvenient and possibly insecure.

DETAILED DESCRIPTION

Figure 1:
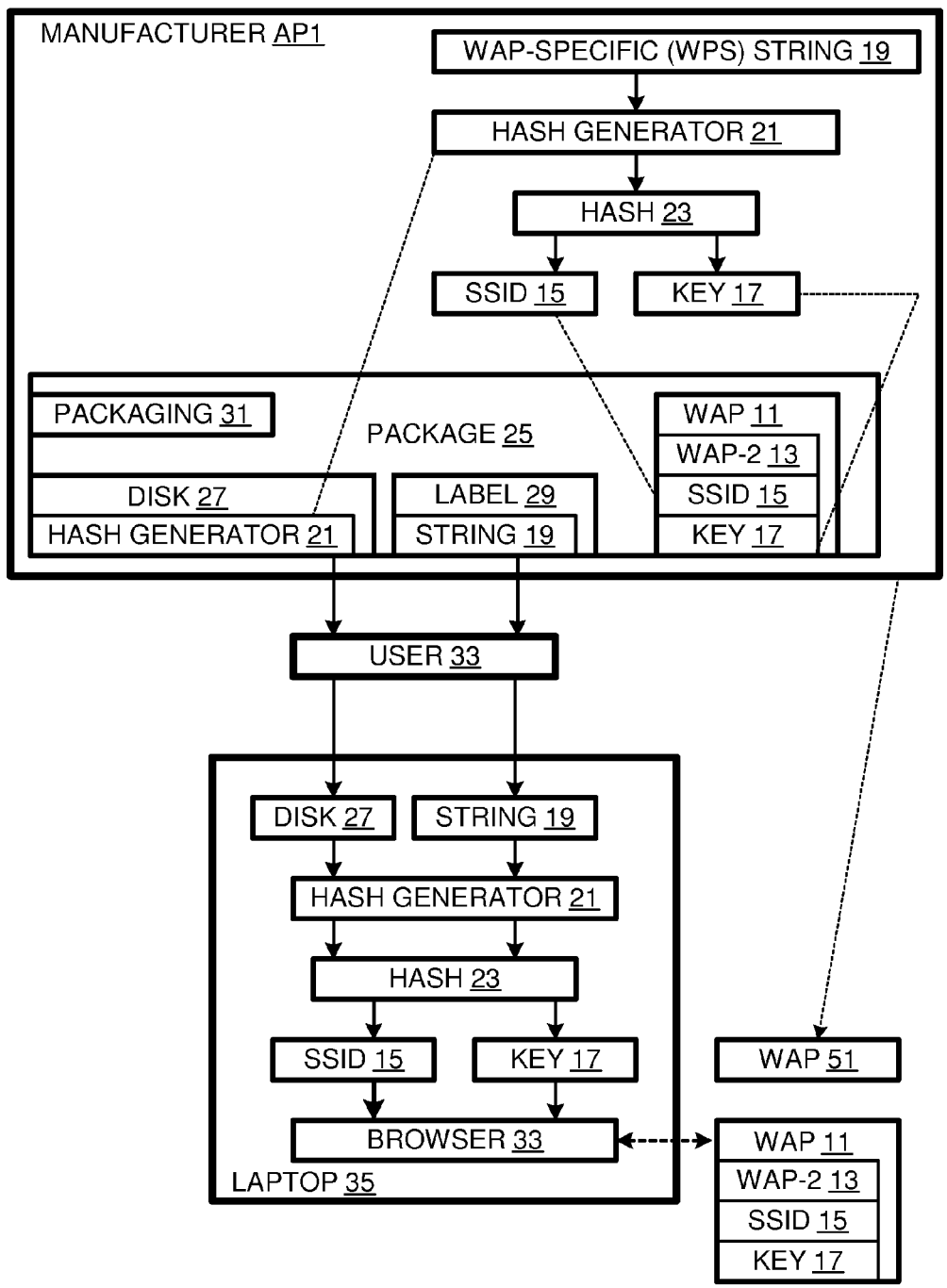
FIG. 1 is a flow diagram of a wireless-device setup method.

A manufacturer AP1 manufactures wireless-access-point devices including wireless access points and converged devices. The converged devices can serve as wireless access points and at least one other function of devices such as routers, Ethernet switches, or broadband modems. FIG. 1 represents one such device, WAP 11. By "manufacturer" is meant any company or group of companies involved in bringing a device to market through packaging and shipping.

The manufactured devices support various wireless security protocols, including WEP, WPA, and WPA2 (in order of increasing security), to prevent unauthorized users from accessing a wireless access point. Manufacturer AP1 ships WAP-devices configured with WPS (WiFi Protected Setup) keys, which are identified on the devices and in the packaging. However, for enhanced security, the devices are shipped with WPA2 security as a default, as indicated at 13. WPA2 security requires that an SSID, e.g., SSID 15 and a key (i.e., passphrase), e.g., key 17 be set. Manufacturer AP1 chooses the configured SSID and key as follows.

Manufacturer AP1 assigns a collision-resistant string 19 to each wireless access point device (at least of a particular model) it manufacturers. By "collision-resistant" is meant "unique" or sufficiently close to unique that it is very unlikely (less than 1% chance) that a randomly selected pair would share the same string. For example, such a string can be generated by concatenating two randomly selected dictionary words. However, in the illustrated embodiment, the string is a randomly or quasi-randomly generated eight-character string chosen such that it can also serve as the WPS key. The choice to use the key also as a WPS key provides the user with the benefit that one string can serve two purposes, which reduces complexity. In an alternative embodiment, the string used to generate the SSID and WPA2 key is independent of the WPS key.

So that a user can transcribe the SSID and the WPA2 key, certain constraints may be imposed oh hash generator 21. Specifically, while it can accept any characters as inputs, hash generator 21 does not produce any ambiguous characters that might invite errors when a user attempts to transcribe the resulting SSID 15 and key 17. Ambiguous characters can include as "1" (one), "l" (lower case "L"), "I" (upper case "i"), "O" (upper case "O"), "o" (lower case "o") and "0" (zero).

The assigned string 19 is entered into a hash generator 21, which generates a 16-character collision-resistant hash 23 from string 19. The first five characters of the hash are used as part of the device SSID 15 and the last ten characters are used as the device key 15. The sixth character is not used.

Manufacturer AP1 packages each device. For example, package 25 includes WAP device 11, a CD-ROM disk 27, a label 29, and packaging 31. Label 29 is human-readable media displaying string 19 in human-readable form. Label 29 may be attached to WAP device 11 and/or to packaging 31. CD-ROM disk 27 has tangibly encoded thereon programs and code of computer-executable instructions including hash generator 21 for generating SSID 15 and key 17 from string 19.

A user 33 purchases or otherwise obtains package 25. Disk 27 is inserted into a CD-ROM drive of a wireless-enabled computer, such as a laptop computer 35, and hash generator 21 is installed thereon. User 33 reads string 19 from label 29 and enters string 19 into the instance of hash generator 21 on laptop 35. Hash generator 21 generates hash 23, from which SSID 15 and key 17 are determined by laptop 35. The laptop OS is configured to use these values to access WAP device 11.

Note that WAP device 11 is protected by strong WPA2 security at least until user 33 decides to change the default settings, even without a wired connection at setup. Package 25 does not include an Ethernet cable, resulting in some cost savings.

Figure 2:
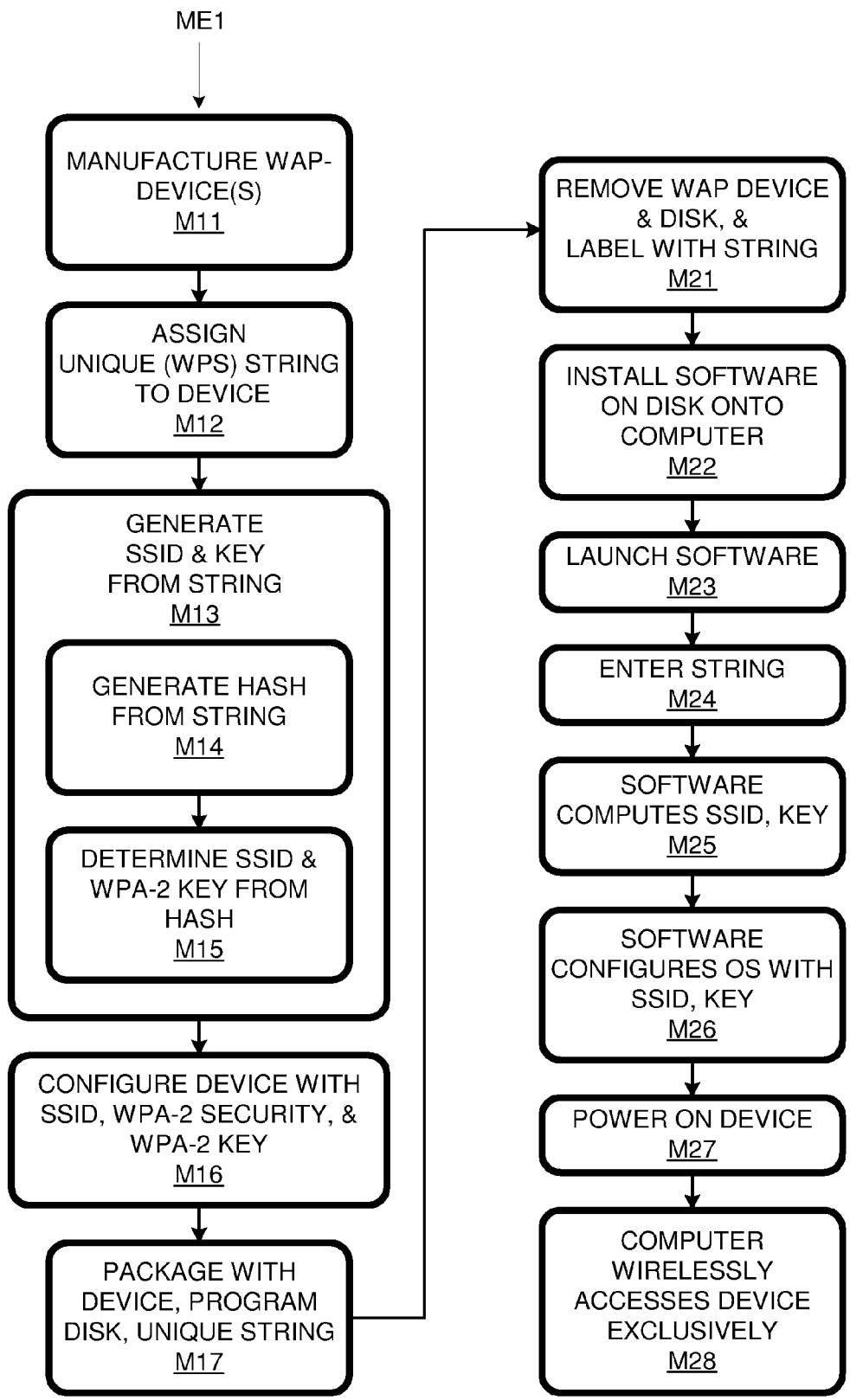
FIG. 2 is a flow chart of a portion of a wireless-device setup method.

A wireless-device setup method is flow charted in FIG. 2. The left side of FIG. 2 emphasizes manufacturer-related aspects of the embodiment. At method segment M11, a manufacturer manufactures a WAP device. At method segment M12, the device is configured with a unique string (that may also be used as a WPS key).

At method segment M13, the WPS string is used to generate an SSID and a key. Two substeps are involved. At substep M14, a hash is generated from the string. At substep M15, the SSID and the key are determined from sections of the hash. At method segment M16, the device is configured to be in WPA2 mode. In addition, the device is configured with the SSID and the key generated at method segment M13.

At method segment M17, the device is packaged with a program disk and a label indicating the string assigned in method segment M12. The label may be on the device or elsewhere in the package or both. In alternative embodiments, media (e.g., a flash memory card or an Internet site) other than a disk are used for storing the hash-generator program.

The right side of FIG. 2 emphasizes the user aspects of method ME1. At method segment M21, a user removes a WAP device, a CD-ROM disk, and a label bearing said string from packaging. The label can be on the device, on the CD-ROM, on a sleeve or case for the CD-ROM, etc. At method segment M22, the CD-ROM is inserted into a computer and the software encoded on the CD-ROM is installed on the computer. Alternatively, another computer-readable storage medium can be included and thus removed from the packaging for installing the software.

At method segment M23, the software is launched on the computer. At method segment M24, the user transcribes the string used to generate the SSID and key into a dialog box presented by the software. At method segment M25, the software then computes the SSID and the key from the string. As noted earlier, this can involve computing a hash from the string and then using respective parts of the hash as the SSID and key. At method segment M26, the software configures the operating system to use WPA2, the computed SSID and the key.

At method segment M27, the WAP device is powered on. Since method segments M22-M26 are not pre-requisites to method segment M27, the latter can be performed at any time between method segments M21 and M28. At method segment M28, the computer (using a wifeless access card) accesses the WAP device, either using the newly installed software or a browser resident on the computer.

Method ME1 prevents "setup crosstalk" even when there is another pre-configured WAP in the vicinity of the one being set up. For example, method segment M11 can be iterated to provide a second WAP 51 (FIG. 1), identical with WAP 11 except for the serial number and network identifiers. However, the unique string applied at method segment M12 is different, so that a different hash, a different SSID, and a different WPA-2 key are involved in the method segments that follow. As a result, when, at method segment M28, laptop 35 access WAP 11 exclusively, e.g., to the exclusion of WAP 51, even though the latter is discoverable by laptop 35.

In method ME1, the user does not have to configure the WAP device. The same string is used as a WPS and as a string to generate both the SSID and the WAP-2 key. The unique SSID computed as in method ME1 increases the reliability of the setup process and avoids crosstalk to another similar WAP device (since the latter will have a different unique SSID). Also, "transcription" errors are avoided since "ambiguous" characters (that might be confused with a similar-looking character) are avoided.

Figure 3:
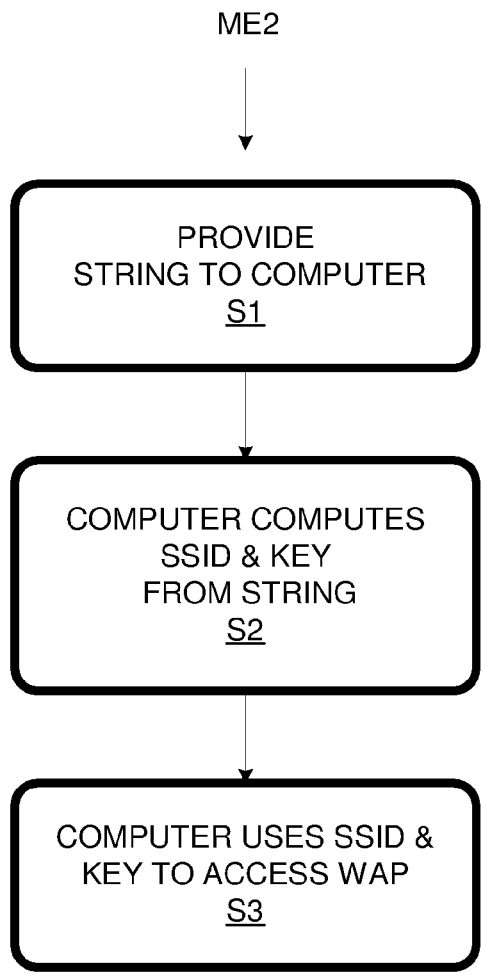
FIG. 3 is a flow chart of a "user-setup" portion of the method of FIG. 2.

An alternative method ME2 of setting up a WAP is flow charted in FIG. 3. At method segment S1, a string is provided to a computer. At method segment S2, the computer computes an SSID and key from the string. At method segment S3, the computer uses the SSID and the key to access the WAP.

Herein, "wireless-access-point device" encompasses wireless access points and converged devices providing the functionality of a wireless access point. Herein, "wireless device" refers to wireless-access-point devices or to devices (e.g., a wireless-enabled computer) that communicate with other devices via a wireless access point, or both. A "wireless-device setup method" can involve, without limitation, setting up one or more of the following: a wireless access point, a converged device, a wireless-enabled computer. The term "manufacture" has the same meaning it has in 35 U.S.C. 101 and encompasses disk 27.

Alternative embodiments use different security protocols (WPA, WEP, other password or passphrase-based security protocols). Further alternatively embodiments provide for different types of devices incorporating wireless-access-point functionality, different client computers, etc. These and other variations upon and modifications to the illustrated methods are provided for by the following claims.

What is claimed is:

1. A wireless-device set-up method comprising:
providing a string to a wireless-enabled computer, wherein the string is presented in human-readable form on a human-readable label;
computing, by said computer, an SSID (Service Set Identifier) and a key from said string;
using, by said computer, said SSID and said key to wirelessly connect to a first wireless-access-point device that is pre-configured with said SSID and said key prior to said providing.

2. A wireless-device set-up method as recited in claim 1 further comprising removing said first wireless-access-point device and the human-readable label presenting said string in human-readable form from packaging.

3. A wireless-device set-up method as recited in any of claim 1 or 2 further comprising a manufacturer configuring said first wireless-access-point device with said SSID and said key.

4. A wireless-device set-up method as recited in claim 1 further comprising packaging with said human-readable label said first wireless-access-point device configured with said SSID and said key.

5. A wireless-device set-up method as recited in claim 1 further comprising installing a program on said computer for computing said SSID and said key from said string.

6. A wireless-device set-up method as recited in claim 5 further comprising packaging computer-readable storage medium tangibly encoded with said program with said first wireless-access-point device, said installing involving said computer reading said program from said medium.

7. A wireless-device set-up method as recited in claim 1 wherein said wirelessly connecting involves wirelessly connecting to said first wireless-access-point device and detecting but not connecting to a second wireless-access-point device.

8. A package comprising:
a wireless-access-point device pre-configured with an SSID (Service Set Identifier) and a first key;
a human-readable label presenting a string in human-readable form; and
computer-readable storage media encoded with computer-executable code, said code, when executed by a computer, providing for computing said SSID and said key from said string after said wireless-access-point device has been pre-configured with said SSID and said first key.

9. A package as recited in claim 8 wherein said code, when executed by a computer, further provides for connecting said computer to said wireless-access-point device.

10. A package as recited in any of claim 8 or 9 wherein said wireless-access-point device is configured with said string as a WPS key.

11. A wireless-device set-up method as recited in claim 2 further comprising packaging said first wireless-access-point device, configured with said SSID and said key, with said human-readable label.

12. A wireless-device set-up method as recited in claim 3 further comprising packaging said first wireless-access-point device, configured with said SSID and said key, with said human-readable label.

13. A wireless-device set-up method as recited in claim 2 further comprising installing a program on said computer for computing said SSID and said key from said string.

14. A wireless-device set-up method as recited in claim 13 wherein said packaging involves packaging computer-readable storage medium tangibly encoded with said program with said first wireless-access-point device, said installing involving said computer reading said program from said medium.

15. A wireless-device set-up method as recited in claim 3 further comprising installing a program on said computer for computing said SSID and said key from said string.

16. A wireless-device set-up method as recited in claim 15 wherein said packaging involves packaging computer-readable storage medium tangibly encoded with said program with said first wireless-access-point device, said installing involving said computer reading said program from said medium.

17. A wireless-device set-up method as recited in claim 4 further comprising installing a program on said computer for computing said SSID and said key from said string.

18. A wireless-device set-up method as recited in claim 17 wherein said packaging involves packaging computer-readable storage medium tangibly encoded with said program with said first wireless-access-point device, said installing involving said computer reading said program from said medium.

\* \* \* \* \*